United States Patent Office 3,554,970
Patented Jan. 12, 1971

3,554,970
LATENT HARDENER FOR EPOXY RESINS COMPRISING DICYANDIAMIDE AND AN AMINOALKYL GLYCOL MONOBORATE ESTER
Raymond Michael Moran, Jr., Brick Town, and Henry Thomas Blekicki, Convent Station, N.J., assignors to Ciba Corporation, New York, N.Y., a corporation of Delaware
No Drawing. Filed Sept. 26, 1967, Ser. No. 670,770
Int. Cl. C08g 30/14
U.S. Cl. 260—47                                 11 Claims

ABSTRACT OF THE DISCLOSURE

Salts of aminoalkyl glycol monoborate esters, illustratively, 2-($\beta$-dimethylaminoethoxy)-4-methyl - 1,3 - dioxa-2-borinane phenate, are effective latent accelerators for dicyandiamide in the curing of epoxy resin systems. The combination of dicyandiamine with aminoalkyl glycol monoborate ester salts will provide systems when combined with epoxy resins which will be stable for long periods when stored at ambient temperatures while still providing hardened products of satisfactory properties on curing for relatively short periods at elevated temperatures.

BACKGROUND OF THE INVENTION

Various chemical substances have heretofore been employed as hardening agents for epoxy resins. Most usually, these chemical hardening agents have been organic acid anhydrides or amines, although other agents, such as boron trifluoride or complexes thereof are frequently used. Dicyandiamide has also been employed as an epoxy curing agent and does exhibit some latent properties.

However, none of the previously employed hardening agents provide combinations on admixture with epoxy resins which are completely satisfactory. Among the disadvantages which can be noted in such combinations are a limited shelf life or stability and/or the fact that relatively long cures at elevated temperatures are frequently required in order to achieve satisfactory cured properties.

SUMMARY OF THE INVENTION

This invention relates to and has for its objects the provision of novel epoxy resin hardener compositions, hardenable epoxy resin compositions and cured products obtainable therefrom.

In accordance with the present invention, it has been found that aminoalkyl glycol monoborate ester salts are latent accelerators for dicyandiamide in the production of hardened products from epoxy resin systems. The combination of said esters with dicyandiamide when employed in epoxy resin compositions provides epoxy resin systems which are stable for long periods when stored at ambient temperatures or at moderately elevated temperatures while still providing on curing for relatively short periods at elevated temperatures, for example, for about 5 to 10 minutes at 150° C., hardened products of satisfactory properties. It is particularly notable that the properties obtained on curing combinations of epoxy resin and the novel hardener composition of the present invention which have been stored for periods of six months or longer are of the same order as the properties obtained on curing freshly prepared combinations of epoxy resin and the hardener composition of the present invention.

The novel curable compositions of the present invention are readily prepared by known mixing techniques familiar to those working in the epoxy resin field. On curing, the composition of the present invention yield cured products exhibiting very good properties.

DESCRIPTION OF THE PREFERRED EMBODIMENT

The epoxy compounds employed are the 1,2-epoxy compounds having a 1,2-epoxy equivalency greater than 1.

As epoxide compounds there can be used esters such as are obtainable by the reaction of a di- or polybasic carboxylic acid with epichlorohydrin or dichlorohydrin in the presence of an alkali. Such polyesters may be derived from aliphatic dicarboxylic acids, such as oxalic acid, succinic acid, glutaric acid, adipic acid, pimelic acid, suberic acid, azelaic acid, sebacic acid, and especially aromatic dicarboxylic acids, such as phthalic acid, terephthalic acid, 2:6-naphthalene-dicarboxylic acid, diphenyl-ortho:ortho'-dicarboxylic acid, ethylene glycol bis-(para-carboxyphenyl)ether or the like. Others which may be used are, for example, diglycidyl adipate and diglycidyl phthalate, and also diglycidyl esters which correspond to the average formula:

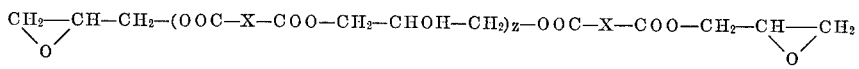

in which X represents an aromatic hydrocarbon radical such as a phenyl group, and Z represents a small whole number or a small fractional number.

There may also be employed the polyglycidyl ethers such as are obtainable by the interaction of a dihydric or polyhydric alcohol or a diphenol or polyphenol with epichlorohydrin or related substances, for example, glycerol dichlorohydrin, under alkaline conditions or alternatively in the presence of an acidic catalyst with subsequent alkaline treatment. These compounds may be derived from glycols, such as ethylene glycol, diethylene glycol, triethylene glycol, propylene glycol-1:2, propylene glycol-1:3, butylene glycol-1:4, pentane-1:5-diol, hexane-1:6-diol, hexane-2:4:6-triol, glycerine and especially diphenols or polyphenols such as pyrocatechol, hydroquinone, 1:4-dioxynaphthalene, 1:5-dioxynaphthalene, phenyl-formaldehyde condensation products, cresol-formaldehyde condensation products, bis-(4-hydroxyphenyl)-methane, bis-(4-hydroxyphenyl)-methyl-phenylmethane, bis - (4 - hydroxyphenyl)-tolylmethane, 4:4' - dioxydiphenyl, bis-(4-hydroxyphenyl)sulphone and (for preference) 2:2-bis-(4-hydroxyphenyl)propane. There may also be employed ethylene glycol diglycidyl ether and also diglycidyl ethers which correspond to the average formula:

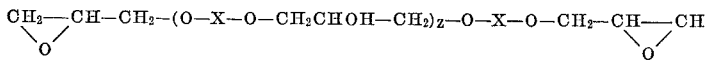

in which X represents an aromatic radical, and Z represents a small whole number or fractional number.

Especially suitable epoxide resins are those that are liquid at room temperature, for example, those obtained from 4:4' - dihydroxydiphenyl-dimethylmethane (bisphenol-A), which have an epoxide content of about 3.8 to 5.88 epoxide equivalents per kilogram. Such epoxide resins correspond, for example, to the average formula:

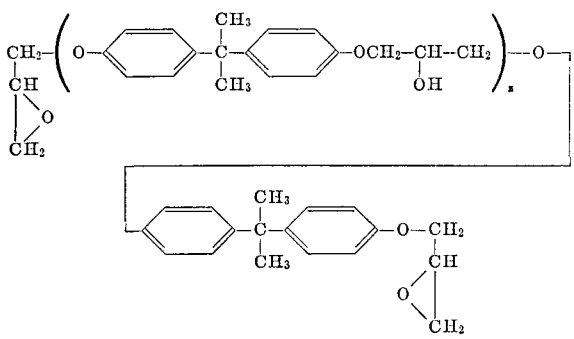

in which Z represents a small number or small fractional number, for example, between 0 and 2.

The aminoalkyl glycol monoborates whose salts are employed in the practice of the present invention have the general formula

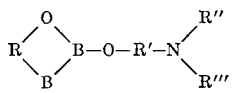

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R'' and R''' are selected from the group consisting of hydrogen and the alkyl radicals of from 1 to about 18 carbon atoms.

Specific examples of suitable aminoalkyl glycol monoborate esters, whose salts are employed according to the present invention, are:

2-($\beta$-dimethylaminoisopropoxy)-4,5-dimethyl-1,3-dioxa-2-borinane
2-($\beta$-diisopropylaminoethoxy)-1,3-dioxa-2-borinane
2-($\beta$-dimethylaminoethoxy)-4-methyl-1,3,-dioxa-2-borinane
2-($\beta$-di-n-butylaminoethoxy)-4-methyl-1,3-dioxa-2-borinane
2-($\beta$-dimethylaminoethoxy)-4,4,6-trimethyl-1,3-dioxa-2-borinane
2-($\beta$-di-n-butylaminoethoxy)-4,4,6-trimethyl-1,3-dioxa 2-borinane
N-ethyl-2-aminoethyl-2,4-dimethyl-1,3-dioxa-2-borinane
2-($\beta$-diethylaminoethoxy)4,4,6-trimethyl-1,3-dioxa-2-borinane
2-($\beta$-diethylaminoethoxy)-1,3-dioxa-2-borinane
2-($\gamma$-aminopropoxy)-4-methyl-1,3-dioxa-2-borinane These esters and their preparation are described in U.S. Patent No. 3,257,347.

The phenates of the above-described compounds can also be employed.

The ratio of dicyandiamide to salts of aminoalkyl glycol monoborate esters can vary over a relatively wide range. In general, the proportion of dicyandiamide to ester salt will be from about 15:1 to about 2:1, with a ratio of 10:1 representing the optimum proportions.

The ratio of dicyandiamide to epoxy resin can vary over a wide range. Thus, the proportion of hardener composition to epoxy resin can range from about 4 parts of hardener to 100 parts of resin to about 15 parts of hardener to 100 parts of resin.

The following examples will serve to illustrate the invention. The parts referred to are parts by weight.

EXAMPLE 1

Preparation of epoxy resin 520 parts of 2,2-bis(4-hydroxyphenyl) propane and 1300 parts of epichlorohydrin and 25 parts of water are heated to 60° C. with agitation and 180 parts of flaked sodium hydroxide are added in several increments and the temperature maintained at 60° C. for 30 minutes following the addition of the final increment. Unreacted epichlorohydrin and water are then removed under vacuum. The reaction mixture is cooled to 90° C. and about 700 parts of water are added. The mixture is agitated for 30 minutes at 90° C., permitted to settle and the brine layer is drawn off. The material is washed with water, vacuum stripped and cooled under vacuum and discharged. An epoxy resin is obtained having a Brookfield viscosity at 23° C. of 13,000 cps., and an epoxy value of 5,3 eg./kg.

EXAMPLE 2

100 parts of the epoxy resin of Example 1, 10 parts of dicyandiamide and 1 part of 2-$\beta$-dimethylaminoethoxy)-4-methyl-1,3-dioxa-2-borinane phenate are thoroughly admixed on a 3-roll mill at 25° C. The resultant combination is employed to form and test an aluminum to aluminum adhesive bond in accordance with MIL-A-5090D, "Adhesive Heat Resistant, Airframe Structural, Metal-to-Metal," curing of the combination being effected by heating for 5 minutes at 150° C.

Tensile shear strengths of 3520 pounds per square inch at 25° C., of 4320 pounds per square inch at 82° C., of 1710 pounds per square inch at 121° C., and of 600 pounds per square inch at 149° C., are obtained.

The above procedure is repeated on a combination of 100 parts of the epoxy resin of Example 1, 10 parts of dicyandiamide and 1 part of 2-($\beta$-dimethylaminoethoxy)-4-methyl-1,3-dioxa-2-borinane phenate which has been stored for 3 months at 25° C. The same satisfactory properties are realized when the composition is cured for 5 minutes at 150° C.

What is claimed is:

1. A hardenable composition comprising (a) a 1,2-epoxy resin having a 1,2-epoxy equivalency greater than 1, (b) as curing agent, dicyandiamide, and (c) as accelerator, an aminoalkyl glycol monoborate ester having the formula

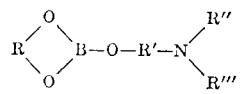

where R is an alkylene radical of from 2 to 4 carbon atoms in length and containing a total of from 2 to about 20 carbon atoms, R' is an alkylene radical of from 2 to 3 carbon atoms in length and containing a total of from 2 to 4 carbon atoms, and R'' and R''' are hydrogen or alkyl radicals of from 1 to about 18 carbon atoms or salts thereof, wherein the ratio of (a) to (b) is from about 100:4 to about 100:15 and the ratio of (b) to (c) is about 10:1.

2. A composition according to claim 1, wherein the salt is a phenate salt.

3. A composition according to claim 1, wherein the 1,2-epoxy compound is a polyglycidyl ether of a polyhydric phenol.

4. A composition according to claim 3, wherein the polyhydric phenol is bis(para-hydroxyphenyl)-dimethyl-methane.

5. A composition according to claim 1, wherein the salt is 2 - ($\beta$-dimethylaminoethoxy)-methyl-1,3-dioxa-2-borinane phenate.

6. A process for the preparation of a hardened resinous mass, which comprises curing at an elevated temperature a 1,2-epoxy compound having a 1,2-epoxy equivalency greater than 1 with dicyandiamide as a curing agent and an aminoalkyl glycol monoborate ester or salt thereof as defined in claim 1 as an accelerator, wherein the ratio of (a) to (b) is from about 100:4 to about 100:15 and the ratio of (b) to (c) is about 10:1.

7. A process according to claim 6, wherein the salt is a phenate salt.

8. A process according to claim 7, wherein the salt is 2-($\beta$-dimethylaminoethoxy)-methyl - 1,3 - dioxa-2-borinane phenate.

9. A hardened resinous mass obtained by curing at an elevated temperature a 1,2-epoxy compound having a 1,2-epoxy equivalency greater than 1 with dicyandiamide as a curing agent and an aminoalkyl glycol monoborate ester or salt thereof as defined in claim 1 as an accelerator, wherein the ratio of (a) to (b) is from about 100:4 to about 100:15 and the ratio of (b) to (c) is about 10:1.

10. A hardened resinous mass according to claim 9, wherein the salt is a phenate salt.

11. A hardened resinous mass according to claim 9, wherein the phenate salt is 2-($\beta$-dimethylaminoethoxy)-methyl-1,3-dioxa-2-borinane phenate.

References Cited

UNITED STATES PATENTS

| | | | |
|---|---|---|---|
| 3,189,639 | 6/1965 | Woods | 260—462 |
| 3,257,347 | 6/1966 | Woods et al. | 260—29.2 |
| 3,391,113 | 7/1968 | Lopez et al. | 260—47 |
| 3,397,715 | 8/1968 | Holmes | 260—2 |
| 3,420,794 | 1/1969 | May et al. | 260—47 |

OTHER REFERENCES

Epoxy Resins, Skeist, 1958, p. 45.
Handbook of Epoxy Resins, Lee et al., March 1967, pp. 10–16.

WILLIAM H. SHORT, Primary Examiner
H. SCHAIN, Assistant Examiner

U.S. Cl. X.R.
161—186; 252—438; 260—2, 49, 59